Aug. 28, 1928.

R. G. PECK ET AL 1,682,243

CANDY JAR

Filed Nov. 30, 1923

Inventors
Robert G. Peck and
Albert Brown
by Emery, Booth, Janney & Varney
Attys Patented Aug. 28, 1928.

1,682,243

UNITED STATES PATENT OFFICE.

ROBERT G. PECK AND ALBERT BROWN, OF CHICAGO, ILLINOIS, ASSIGNORS TO THE ARIDOR COMPANY, OF CHICAGO, ILLINOIS, A CORPORATION OF ILLINOIS.

CANDY JAR.

Application filed November 30, 1923. Serial No. 677,835.

The present invention aims to provide improved means for equipping containers such for example as ordinary candy display jars with hygroscopic material for protecting the contents from humidity. By such protection, hard candies for example may be maintained in dry and glistening condition, so as to enhance the attractiveness of display.

One illustrative embodiment of the invention is shown in the annexed drawings, in which.

Figure 1:
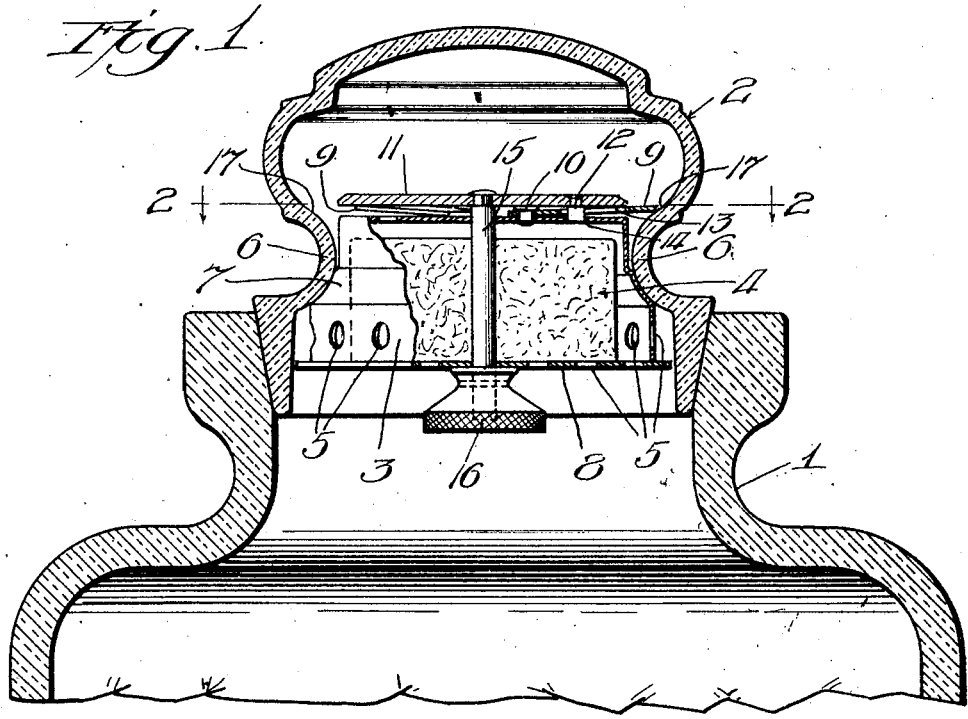
Fig. 1 is a central vertical section of the top portion and cap or closure of a candy display jar containing an embodiment of the invention.

In the drawings, a transparent vertical jar 1, such as is very generally used as a dispensing and display receptacle for hard candies, is shown having a conventional form of hollow glass cap 2, in which is fitted a housing 3 enclosing a hygroscopic body 4. This may be a pad or cake of porous moisture absorbent material impregnated with a moisture attracting agent, e. g. a baked composition of infusorial earth and calcium chloride containing asbestos fibres as a binder. Openings 5 in the housing 3 permit circulation of air in the jar in contact with and through the pores of the hygroscopic material, which will attract and absorb any atmospheric moisture admitted to the jar, thus protecting the contents from effects of humidity and preserving the candies in dry and lustrous condition for attractive display.

The hollow jar cap 2 is shown formed with a constriction 6 between the head of the cap and its lower stopper portion which fits in the mouth of the jar. The housing 3 containing the hygroscopic pad is shown formed with an annular shoulder 7 which bears against the under sloping surface of said constriction, while the upper portion of said housing, being of smaller diameter than its lower portion, is inserted through said constriction. This provides a neat fit, and permits utilization of the constricted interior of the cap for reception of a housing of sufficient vertical dimension to enclose a comparatively thick pad or cake of hygroscopic material. Said housing may be composed of an inverted cup-shaped member, stamped from sheet brass, aluminum, or other appropriate sheet material, and having a bottom plate 8 affixed thereto by brazing. The hygroscopic pad may be enclosed in the cup-shaped member of the housing before its bottom plate is affixed. The aforesaid air circulating openings 5 are preferably provided in the lower lateral walls and bottom of the housing.

For fastening the housing in the glass jar cap, the housing is shown provided at its upper end with outwardly movable fingers 9 to bear on the sloping interior of the jar cap above its constricted portion 6 and thereby support the housing with the hygroscopic pad therein. Said fingers 9, arranged and operating in a substantially horizontal plane, are shown as sector-shaped levers pivoted at 10 to the top of the housing and operatively connected to a rotatable disc 11 by means of studs 12 engaging longitudinal slots 13 in the sector-shaped fingers and projecting into arcuate slots 14 in the top of the housing, which slots 14 limit the rotatable movement of the disc. Said disc 11 is shown affixed to the upper end of an operating rod 15 which passes through a central opening in the hygroscopic pad and is provided at its lower end with a knurled operating knob 16. By turning the disc in one direction, the fingers 9 may be folded or retracted substantially within the confines of the upper smaller end of the hygroscopic pad holder or housing to permit its insertion in the jar cap. By turning the disc in the opposite direction the fingers may be protracted to bear on the slanting inner surface 17 of the jar cap so as to fasten the housing in place.

Figure 2:
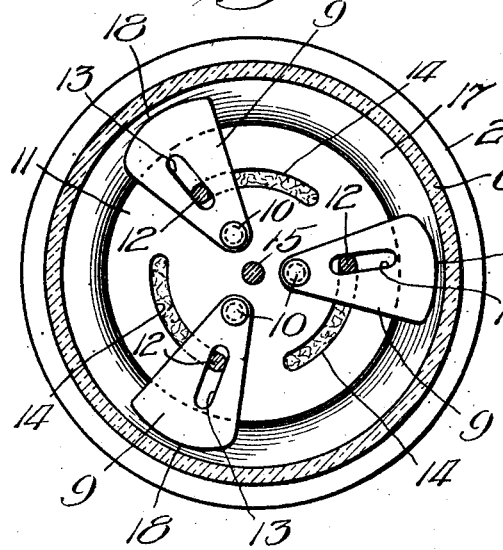
Fig. 2 is a horizontal section on the line 2—2 of Fig. 1, showing a plan view of devices engaging the interior of the jar cap to retain a hygroscopic pad holder therein.
Figure 3:
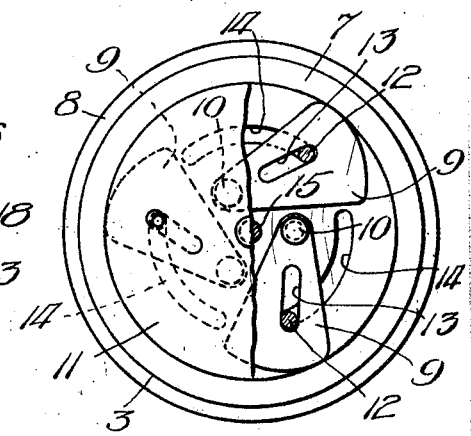
Fig. 3 is a plan view of said hygroscopic pad holder with its said retaining devices folded or retracted to permit insertion of the holder in the jar cap or its withdrawal therefrom.

As the fingers are swung outwardly against the slanting surface 17 of the jar cap, they will be forced slightly upward by engagement with said surface, thereby tending to bind the housing 3 against the constricted portion 6 of the jar cap. By forming the cap-engaging ends of the sector-like fingers with an appropriate curvature of substantially less radius than the length of the fingers, and by proportioning the arcuate slots 14 to permit forcing the bearing points 18 of the fingers beyond the lines of dead centers of the axial rod 15 and pivot studs 10, a locking effect is obtained, resisting accidental release of the fingers when the jar cap is removed; since any movement of the fingers from the locked position shown in Fig. 2 will require forcing them upwardly on the slanting interior surface of the glass jar cap until the bearing points 18 are past the aforesaid lines of dead centers.

The device described provides a practicable and convenient means for obtaining the advantageous dehydrating action of a hygroscopic medium in an ordinary type of candy display jar equipped with a conventional form of hollow glass cap. The pad holding device is easily applied to a jar cap of the type shown by inserting it in the cap and turning the knob 16 to protract the fingers 9 against the sloping interior surface of the cap. When after a considerable period of use the hygroscopic pad has become saturated by moisture absorption, the holder may be easily released and withdrawn from the cap, and may then be placed in an ordinary oven to dry out the pad by baking. In this baking process, there are no parts such as springs or the like which are liable to injury.

The pad holder is of neat and compact construction, and its attaching means is practically concealed by the cover plate provided by the top disc 11, only the protruding ends of the cap-engaging fingers 9 being visible through the glass cap when the pad holder is fastened therein.

By the ready attachability of the pad holder to the conventional form of glass candy jar cap, it is feasible to equip numerous existing candy display jars of standard or ordinary type with such holders, for promoting attractive display of hard candies in such jars.

It will of course be understood that the present invention is not restricted to the particular embodiment thereof herein shown and described.

We claim as our invention:

1. A candy jar cap having a hygroscopic pad holder removably mounted therein, said holder having on its upper side a plurality of devices arranged and operating in a horizontal plane and operable from the lower end of the holder, said devices adapted to be retracted to clear a constriction in the cap and to be projected from the upper end of the holder to engage the interior of the cap to support the holder therein.

2. A hygroscopic pad holder having pivoted fingers and a rotatable disc having slot and stud connections with said fingers for swinging them inwardly and outwardly, whereby said fingers may be retracted to clear a constriction in a candy jar cap and projected to engage the interior of the cap above said constriction.

3. A hygroscopic pad holder having pivoted fingers arranged and operating in a substantially horizontal plane, said fingers adapted to be retracted to clear a constriction in a candy jar cap and to be moved outwardly against an inclined interior wall of said cap above said constriction, the cap-engaging ends of said fingers being formed with a curvature of less radius than the length of said fingers; and a rotatable disc having stud and slot connections with said fingers and adapted to move the bearing points thereof beyond the lines of dead centers of the studs and pivots of said fingers to obtain a locking effect substantially as described.

4. A hygroscopic pad holder adapted to fit in a candy jar cap against a shoulder provided by constriction in the cap, and having a reduced upper end portion insertable through said constriction; and means for attaching said holder in the cap comprisng devices at its upper end foldable to clear said constriction and projectable to engage the interior of the cap above said constriction, said devices manually operable from the lower side of the holder.

5. A device of the class described comprising, in combination, a housing; a plurality of outwardly movable fingers pivoted to and movable horizontally on the top of said housing; and means manually operable from the lower end of said housing for moving said fingers inwardly to clear a constriction in a jar cap and to move them outwardly to engage the interior of the cap above said constriction to support the housing therein.

6. A hygroscopic pad holder comprising a housing adapted to fit in a candy jar cap and having a reduced upper end portion to enter a constriction in the cap; means for attaching said holder in the cap comprising devices at the upper end of the housing retractible to clear said restriction and projectable to engage the interior of the cap above said constriction; and means operable from the lower end of the housing for retracting and projecting said devices.

7. A hygroscopic pad holder comprising a housing adapted to fit in a candy jar cap and having a reduced upper end portion to enter a constriction in the cap; means for attaching said holder in the cap comprising devices movable in a horizontal plane at the upper end of the housing retractible to clear said restriction and projectable to engage the interior of the cap above said constriction; and means operable from the lower end of the housing for retracting and projecting said devices.

8. A hygroscopic pad holder comprising a housing adapted to fit in a candy jar cap; sector shaped fingers pivoted to and movable horizontally on the top of the housing, said fingers having curved ends for engaging the interior of the cap; and operating means connected with said fingers.

In testimony whereof, we have signed our names to this specification.

ROBERT G. PECK.
ALBERT BROWN.